United States Patent
Rambo

(10) Patent No.: US 11,940,232 B2
(45) Date of Patent: Mar. 26, 2024

(54) HEAT EXCHANGERS INCLUDING PARTIAL HEIGHT FINS HAVING AT LEAST PARTIALLY FREE TERMINAL EDGES

(71) Applicant: General Electric Company, Schenectady, NY (US)

(72) Inventor: Jeffrey Douglas Rambo, Evendale, OH (US)

(73) Assignee: General Electric Company, Schenectady, NY (US)

(*) Notice: Subject to any disclaimer, the term of this patent is extended or adjusted under 35 U.S.C. 154(b) by 56 days.

(21) Appl. No.: 17/223,290

(22) Filed: Apr. 6, 2021

(65) Prior Publication Data
US 2022/0316813 A1 Oct. 6, 2022

(51) Int. Cl.
*F28F 1/26* (2006.01)
*F28D 1/053* (2006.01)
*F28F 1/32* (2006.01)

(52) U.S. Cl.
CPC .............. *F28F 1/26* (2013.01); *F28F 1/32* (2013.01); *F28D 1/05383* (2013.01); *F28F 2225/06* (2013.01)

(58) Field of Classification Search
CPC ............ F28F 1/26; F28F 1/32; F28D 1/05383
See application file for complete search history.

(56) References Cited

U.S. PATENT DOCUMENTS

| 4,523,638 A * | 6/1985 | Rosman ............... F28D 9/0018 165/167 |
| 4,749,032 A | 6/1988 | Rosman et al. |
| 5,957,194 A * | 9/1999 | Azar ................... H01L 23/3672 257/722 |
| 7,111,672 B2 | 9/2006 | Symonds |
| 7,334,631 B2 | 2/2008 | Kato et al. |
| 7,445,040 B2 | 11/2008 | Szulman et al. |

(Continued)

FOREIGN PATENT DOCUMENTS

| CN | 107262914 A | 10/2017 |
| CN | 105290739 B | 9/2018 |

(Continued)

OTHER PUBLICATIONS

Translation of JPH1062572A entitled Translation-JPH1062572A (Year: 2023).*

(Continued)

*Primary Examiner* — Paul Alvare
(74) *Attorney, Agent, or Firm* — Dinsmore & Shohl LLP

(57) ABSTRACT

In an embodiment, a heat exchanger includes a monolithic body that includes a first substrate, a second substrate, a third substrate, and a plurality of partial height fins. The second substrate is arranged parallel to and spaced from the first substrate, thereby defining a first fluid flow path. The third substrate is arranged parallel to and spaced from the second substrate opposite the first substrate, thereby defining a second fluid flow path. The plurality of partial height fins extend from one of the second substrate and the third substrate toward the other of the second substrate or the third substrate, wherein a terminal edge of each partial height fin is at least partially spaced from the other of the second substrate or the third substrate.

13 Claims, 11 Drawing Sheets

(56) References Cited

U.S. PATENT DOCUMENTS

| | | |
|---|---|---|
| 7,810,552 B2 | 10/2010 | Slaughter |
| 9,174,312 B2 | 11/2015 | Baughman et al. |
| 9,574,828 B2 | 2/2017 | Van Dijck et al. |
| 9,746,257 B2 | 8/2017 | Fennessy |
| 9,796,048 B2 | 10/2017 | Lacy et al. |
| 9,905,319 B2 | 2/2018 | Castanie et al. |
| 10,365,045 B2 | 7/2019 | Choi |
| 10,372,110 B2 | 8/2019 | Jagdale et al. |
| 10,399,191 B2 | 9/2019 | Rigal et al. |
| 10,429,132 B2 | 10/2019 | Tonellato et al. |
| 2001/0040025 A1* | 11/2001 | Jurisich .................. F28F 3/048 165/166 |
| 2002/0056544 A1* | 5/2002 | Azar ..................... H01L 23/467 257/722 |
| 2002/0139515 A1* | 10/2002 | Azar .................. H01L 23/3672 257/E23.099 |
| 2003/0070793 A1* | 4/2003 | Dierbeck .............. F02M 26/11 165/145 |
| 2007/0071920 A1* | 3/2007 | Muto ..................... F28F 1/022 428/34.4 |
| 2010/0025024 A1* | 2/2010 | Meshenky ............ F02M 26/32 165/173 |
| 2017/0205149 A1* | 7/2017 | Herring .................... F28F 7/02 |
| 2017/0211898 A1 | 7/2017 | Schwalm |
| 2018/0073813 A1* | 3/2018 | Ranjan ..................... F28F 7/02 |
| 2018/0355990 A1 | 12/2018 | Simpson |
| 2018/0372416 A1 | 12/2018 | Vargas et al. |
| 2019/0049187 A1 | 2/2019 | Zeidner et al. |
| 2019/0170445 A1* | 6/2019 | McCaffrey ................ F28F 9/02 |
| 2019/0170455 A1* | 6/2019 | McCaffrey .............. F28F 9/165 |
| 2019/0277576 A1* | 9/2019 | Toubiana ............... B33Y 80/00 |
| 2019/0277579 A1 | 9/2019 | Disori et al. |
| 2019/0277580 A1* | 9/2019 | Disori ...................... F28F 3/08 |
| 2019/0301816 A1 | 10/2019 | Yun et al. |
| 2019/0390912 A1* | 12/2019 | Muneishi .................. F28F 1/16 |
| 2021/0180886 A1* | 6/2021 | Yun ........................ B33Y 80/00 |
| 2022/0316813 A1* | 10/2022 | Rambo .............. F28D 1/05333 |

FOREIGN PATENT DOCUMENTS

| | | | | |
|---|---|---|---|---|
| EP | 3034978 A1 | | 6/2016 | |
| JP | H1062572 A | * | 3/1998 | |
| JP | 2015132420 A | * | 7/2015 | ......... F28D 21/0003 |

OTHER PUBLICATIONS

Translation of JP2015132420A entitled Translation-JP2015132420A (Year: 2023).*

SIW, "Effects of Pin Detached Space on Heat Transfer and Pin-Fin Arrays" ASME, Journal of Heat Transfer, Aug. 2012, vol. 134.

Sparrow, "Natural Convection Heat Transfer from the Upper Plate of a Colinear, Seperated Pair of Vertical Plates" ASME, Journal of Heat Transfer, Nov. 1980, vol. 102.

Moores, "Heat Transfer and Fluid Flow in Shrouded Pin Fin Arrays With and Without Tip Clearance" International Journal of Heat and Mass Transfer, Sep. 2009, pp. 5978-5989, vol. 52.

* cited by examiner

HEAT EXCHANGERS INCLUDING PARTIAL HEIGHT FINS HAVING AT LEAST PARTIALLY FREE TERMINAL EDGES

TECHNICAL FIELD

The present specification generally relates to heat exchangers.

BACKGROUND

Heat exchangers may be conventionally produced through stacked plates that include etched, milled, or stamped grooves, which provide for fluid flow passages. Instead of stacked plates it may be desirable to have a more monolithic design. Monolithic designs may, however, face increased thermal strains as walls and grooves are formed as a single, interconnected piece.

Accordingly, a need exists for alternative monolithic heat exchangers with improved performance under thermal stress.

SUMMARY

In an embodiment, a heat exchanger includes a monolithic body that includes a first substrate, a second substrate, a third substrate, and a plurality of partial height fins. The second substrate is arranged parallel to and spaced from the first substrate, thereby defining a first fluid flow path. The third substrate is arranged parallel to and spaced from the second substrate opposite the first substrate, thereby defining a second fluid flow path. The plurality of partial height fins extend from one of the second substrate and the third substrate toward the other of the second substrate or the third substrate, wherein a terminal edge of each partial height fin is at least partially spaced from the other of the second substrate or the third substrate.

In another embodiment, a heat exchanger includes a monolithic body including a plurality of substantially parallel substrates layered one over the over, and a plurality of partial height fins extending from one of the plurality of substrates toward an adjacent one of the plurality of substrates. A terminal edge of each fin is only partially spaced from the adjacent one of the plurality of substrates to define a connecting foot that is connected to the adjacent one of the plurality of substrates.

In yet another embodiment, a heat exchanger includes a monolithic body including a first substrate; a second substrate, a third substrate, and a plurality of partial height fins. The second substrate is arranged parallel to and spaced from the first substrate, thereby defining a first fluid flow path. The third substrate is arranged parallel to and spaced from the second substrate opposite the first substrate, thereby defining a second fluid flow path. The plurality of partial height fins extend between the second substrate and the third substrate, wherein a terminal edge of each fin is at least partially spaced from one of the second substrate or the third substrate. The plurality of partial height fins include a first type of partial height fin extending from the second substrate into the second fluid flow path, a second type of partial height fin extending from the third substrate into the second fluid flow pat, and a plurality of connector fins. The plurality of partial height fins include a plurality of rows of partial height fins arranged side-by-side, wherein each row includes fins of the first type and the second type. The plurality of connector fins each connect a first fin in a first row to a second fin in a second row, wherein each connector fin is arranged at an oblique angle to a flow direction through the second fluid flow path.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
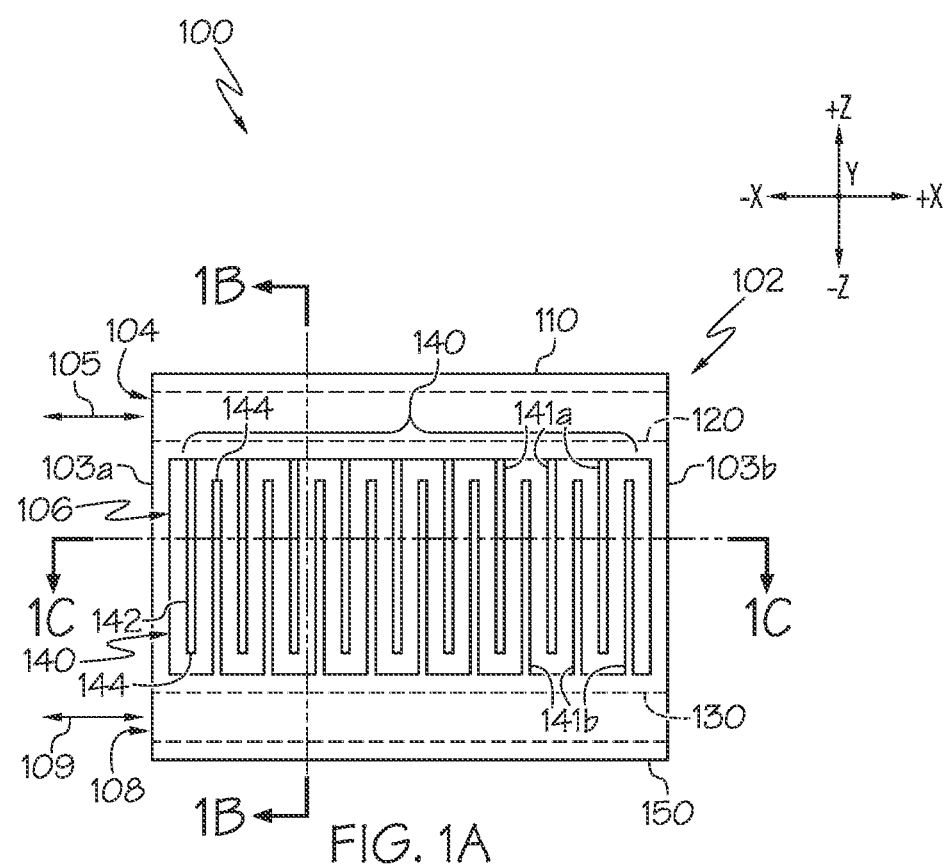
FIG. 1A schematically depicts a side view of a heat exchanger having a plurality of partial height fins, according to one or more embodiments shown and described herein.

Embodiments of the present disclosure are directed to heat exchangers that include partial height fins having at least partially free terminal edges. The heat exchangers may include a monolithic body comprising a first substrate, a second substrate, a third substrate, and a plurality of partial height fins. The fins are termed "partial height" in that they at least partially terminate free at terminal edges leaving a gap between the terminal edges and the closest adjacent substrate. The second substrate is arranged parallel to and spaced from the first substrate, thereby defining a first fluid flow path. The third substrate is arranged parallel to and spaced from the second substrate opposite the first substrate, thereby defining a second fluid flow path. The plurality of partial height fins extend between the second substrate and the third substrate, wherein a terminal edge of each fin is at least partially spaced from one of the second substrate or the third substrate. As will be described in greater detail herein, use of partial height fins may provide improved thermal performance, reduced thermal strain, and longer heat exchanger life.

Heat exchangers are devices that are used to transfer heat between two or more fluids. Heat exchangers may be used for engine cooling (e.g., in the aviation or vehicle industries), electronics cooling, or the like. In particular, heat exchangers according to the present disclosure may be useful in high-pressure environments (e.g., up to and/or including pressures of 10,000 psi or greater). Referring generally to the figures, various monolithic heat exchanger embodiments are depicted. As used herein, the term "monolithic" refers to a structure formed as a single piece, such as through use of an additive manufacturing process, though other manufacturing processes are contemplated and possible.

For example, heat exchangers, according to the present disclosure, may be additively manufactured by forming layers or substrates having a plurality of partial height fins extending therebetween. That is, the heat exchangers may be integrally formed such that each layer is integrally connected to the proceeding layer through such processes as additive manufacturing or printing, metal casting, machining, etc. Additive printing techniques include, for example, selective laser sintering (SLS), direct metal laser sintering (DMLS), and other three dimensional printing (3DP) modalities. The materials can include stainless steel, aluminum, titanium, Inconel 625, Inconel 718, cobalt chrome, among other metal materials. In addition, ceramics may be used for very high-temperature applications. In each of these powder-based fabrication methods, powdered material is melted or sintered to form each part layer. For example, the SLS process utilizes powdered plastic materials that are selectively sintered by a laser layer-by-layer. Other types of additive manufacturing techniques include 3D printing including stereolithography (SLA), jetted photopolymer, or ink jet printing. Other types of additive printing include solid-based processes, which use non-powdered materials that are layered one on top of another and subsequently cut out. These methods includes laminated object manufacturing (LOM) or fused deposition modeling (FDM). Any of the above techniques may be utilized to form the integral heat exchangers of the present disclosure. However, such monolithic designs may result in increased thermal strains relative to conventional plate layers which may then be coupled to one another together. Accordingly, and as will be described in greater detail herein, embodiments of the present disclosure include partial height fins, which may introduce a level of thermal compliance that improves thermal performance of the heat exchanger to reduce thermal stress, thereby increasing to life of the heat exchanger.

As used herein, the term "partial fin height" or "partial height fin" refers to a fin, which has a terminal edge that is at least partially spaced from a substrate that is opposite the substrate from which it extends. That is, at least a part of a partial height fin extends only a portion of the distance between two parallel substrates. In this way, a gap may be positioned between partial height fin at the terminal edge and the substrate that is opposite the substrate from which it extends, thereby providing increased flexibility and thermal compliance to the heat-exchanger substrate.

Figure 1B:
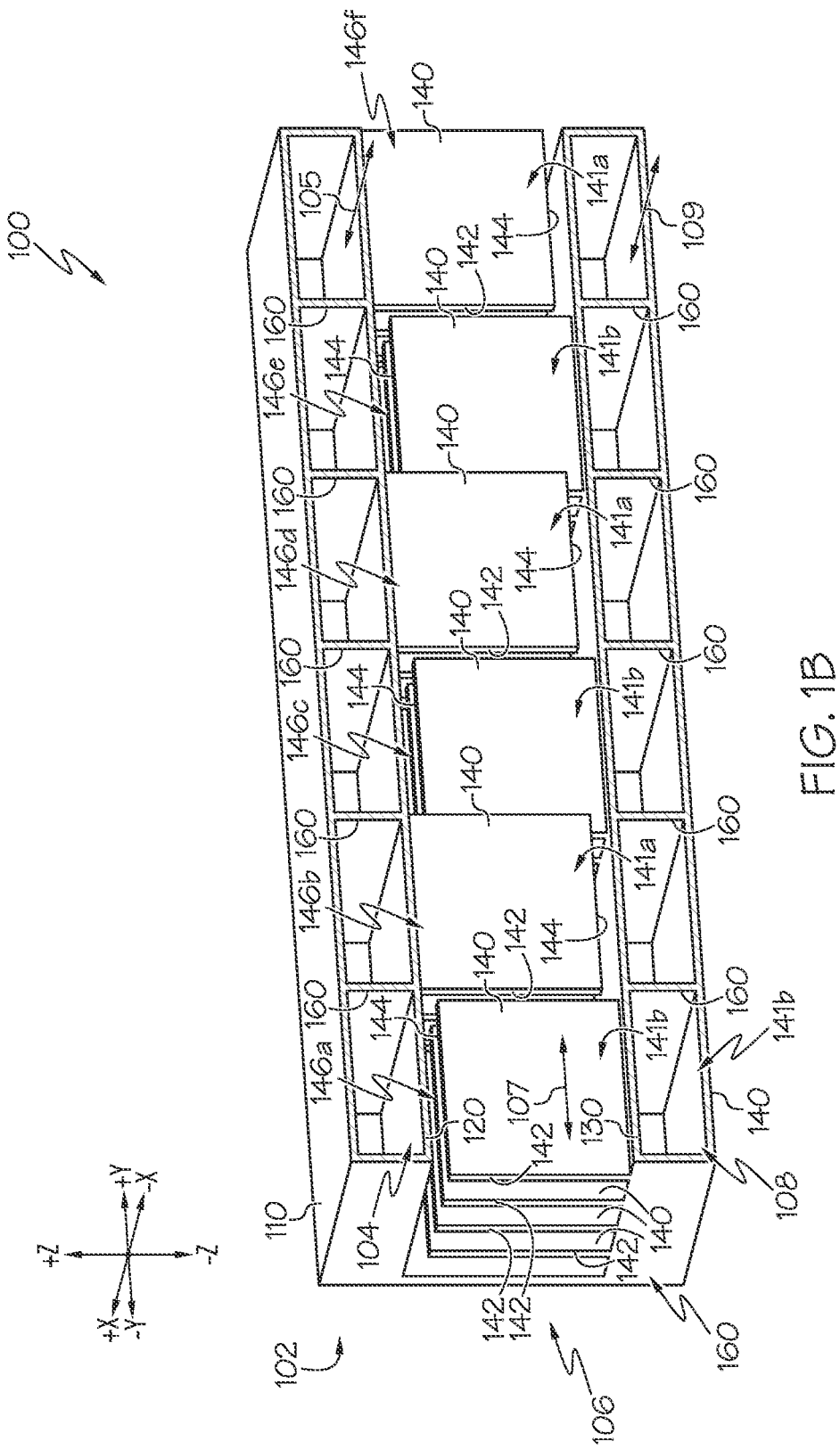
FIG. 1B schematically depicts a cross-sectional view of the heat exchanger of FIG. 1A taken along line 1B-1B, according to one or more embodiments shown and described herein.
Figure 1C:
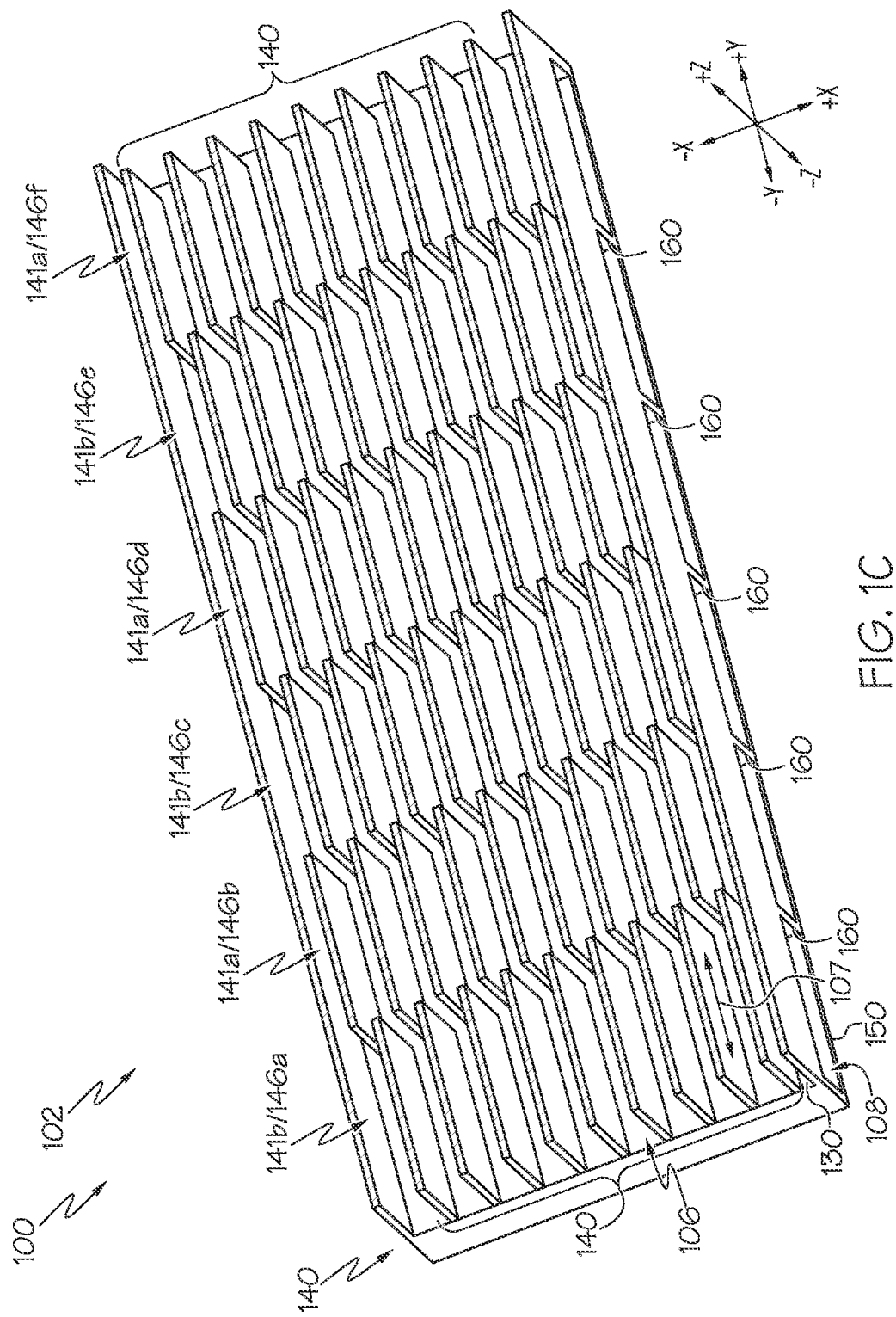
FIG. 1C depicts a cross-sectional view of the heat exchanger of FIG. 1A taken along line 1C-1C, according to one or more embodiments shown and described herein.

Referring now to FIGS. 1A-1C, a heat exchanger 100 is schematically depicted. The heat exchanger 100 includes a body 102 which is monolithically formed by one or more of the methods described above, such that each layer of the body 102 of the heat exchanger 100 is integral with the next. It is noted that in some embodiments, each layer may be separately formed and then fixed to one another via brazing, welding, diffusion bonding, or the like, as will be described in further embodiments below.

Still referring to FIGS. 1A-1C, the monolithic body 102 may include a plurality of substantially parallel substrates such as a first substrate 110, a second substrate 120 arranged parallel to and spaced from the first substrate 110 in the Z direction of the depicted coordinate axes, thereby defining a first fluid flow path 104 in the X direction. A third substrate 130 may be arranged parallel to and spaced from the second substrate 120 in the Z direction of the depicted coordinate axes, opposite the first substrate 110, thereby defining a second fluid flow path 106 in the Y direction. In some embodiments, a fourth substrate 150 may be arranged parallel to and spaced from the third substrate 130, in the Z direction of the depicted coordinate axes, opposite the second substrate 120, thereby defining a third fluid flow path 108 in the X direction.

In embodiments, the first fluid flow path 104 and the second flow path flow 106 may be arranged in a cross-flow pattern with one another such that a direction of flow 105 of the first fluid flow path 104 is perpendicular to the direction of flow 107 (depicted in FIG. 1B) of the second fluid flow path 106. In other embodiments, the direction of flow 105 of the first fluid flow path 104 may be parallel to the direction of flow 107 of the second fluid flow path 106. Other orientations are contemplated and possible. For example, the flow paths 104, 106, 108 may not be substantially linear, as depicted, but may include turns or curves. Additionally, the third fluid flow path 108 may be arranged such that a direction of flow 109 through the third fluid flow path 108 is parallel to the direction of flow 105 through first fluid flow path 104. In other embodiments, the direction of flow 109 through the third fluid flow path 108 may instead be parallel to the direction of flow 107 through the second fluid flow path 106.

In embodiments, the body 102 of the heat exchanger 100 includes a first sidewall 103a and a second sidewall 103b (FIG. 1A) positioned on either side of the fluid flow paths 104, 106, and/or 108. The first sidewall 103a and the second sidewall 103b may extend between and connect the first substrate 110, the second substrate 120, the third substrate 130, and/or the fourth substrate 150. Openings (not shown) formed within the sidewalls 103a, 103b may provide access for fluidically coupling the fluid flow paths 104 and 108 through tubing, manifolds, or the like, allowing fluid to be supplied to multiple passages through a common interface.

Arranged within the second fluid flow path 106, between the first sidewall 103a and the second side wall may be a plurality of partial height fins 140. Each fin 140 of the plurality of partial height fins 140 may extend generally parallel to the vertical direction (i.e., the Z-axis of the depicted coordinate axes). Each fin 140 may be sized and shaped to minimize thermal stresses between the fins 140 and the opposite substrate from which it extends. For example, each fin 140 may have a thickness of about 5 mm to about 50 mm along the X direction of the depicted coordinate axes and may have a length (along the Y direction) and a height (along the Z direction) that are larger than the width-wise dimension of the fin 140. The lengthwise dimension of the plurality of fins may be arranged parallel to the flow direction 107, as illustrated in FIG. 1B.

The plurality of partial height fins 140 may extend between the second substrate 120 and the third substrate 130. As described above, partial height fins refer to fins which extend only a portion of the distance between the second substrate 120 and the third substrate 130. For example, each fin 140 may include a terminal edge 144, the terminal edge 144 of each fin 140 is the edge facing opposite the second substrate 120 or the third substrate 130 from which the fin 140 extends and is at least partially spaced from one of the second substrate 120 or the third substrate 130. At an end opposite the terminal edge 144 the fins are integrally formed with the second or third substrate 120, 130. As noted above, each find 140 is sized and shaped to minimize thermal stresses between the plurality of fins and the opposite substrate from which is extends. This reduction in thermal stress is provided via minimizing coupling between the terminal edge 144 and the opposite substrate. For example, the terminal edge 144 may be partially or completely uncoupled from the opposite substrate. Accordingly, the height of the partial height fin 140 where the terminal edge 144 of the fin 140 may extend less than 100% of the distance between the second substrate 120 and the this substrate 130, such as between about 20% and about 99%, such as between about 50% and about 98%, so other percentage distances are contemplated and possible.

In embodiments, the heat exchanger 100 may include a first type 141a of partial height fins 140, which extend from the second substrate 120 into the second fluid flow path 106 (e.g., toward the third substrate 130) and a second type 141b of partial height fins 140, which extend from the third substrate 130 into the second fluid flow path 106 (e.g., toward the second substrate 120). As may be observed in FIG. 1B, the plurality of partial height fins 140 may include a plurality of rows 146a-146f extending along the X direction of the depicted coordinate axes, wherein each row is arranged side-by-side to one another in the Y direction (e.g., the longitudinal direction) of the depicted coordinate axes. Each row 146a-146f may alternate from including fins 140 of the first type 141a in one row to fins of the second type 141b in an adjacent row. Stated another way, and as depicted in FIG. 1C, the first row 146a may only include fins 140 of the second type 141b (e.g., extending from the third substrate 130, wherein at least a portion of the terminal edge 144 of each fin 140 is spaced from the second substrate 120), a second row 146b may include only fins 140 of the first type 141a (e.g., extending from the second substrate 120, wherein at least a portion of the terminal edge 144 of each fin 140 is spaced from the third substrate 130), a third row 146c may include only fins 140 of the second type 141b, a fourth row 146d may include only fins 140 of the first type 141a, and so one and so forth. It is noted that the heat exchanger 100 may include any number of rows without departing from the scope of the present disclosure (e.g., two or more rows, three or more rows, four or more row, etc.).

Referring to FIGS. 1A and 1C, the partial height fins 140 of each row 146a-146f may be laterally offset in the X direction of the depicted coordinate axes from the partial height fins 140 of an adjacent row. Accordingly, when viewed along the Y direction of the depicted coordinate axes, fins 140 of the first type 141a appear to be located between fins 140 of the second type 141b in the X direction of the depicted coordinate axes. Staggering the partial height fins 140 in the X restarts thermal boundary layers and introduces additional fluid mixing, which can increase heat transfer efficiency.

Using partial height fins 140 provides several advantages. For instance, use of partial height fins 140 structurally decouples the heat exchanger 100 thermal performance from the stress/life of the heat exchanger 100. In particular, partial height fins 140 reduce mechanical coupling between the second substrate 120 and the third substrate 130 compared to fully coupled fins, which may reduce thermal stress experienced by the heat exchanger 100. Moreover, thermal compliance of monolithic heat exchangers are improved as the partial height fins 140 provide flexure to allow for thermal expansion/contraction. Accordingly, use of partial height fins 140 may improve life of the monolithic heat exchanger 100 leading to cost savings and a reduced need for maintenance. Additionally, partial height fins 140 within the overall heat exchanger structure may be difficult to manufacture using traditional manufacturing techniques. With additive manufacturing procedures, partial height fins 140 may be more easily achieved and may be provided with various modifications, as will be described in further detail herein, by simply modifying the computer aided design. In embodiments, partial height fins 140 may be designed to enhance heat transfer coefficient while reducing pressure drop relative to a conventional fin (e.g., full-height fin). Accordingly, monolithic heat exchangers may be provided as a competitive alternative to conventional heat exchangers. Moreover, conventional plate-fin heat exchangers may be practically limited to operating pressures of less than 400 psia. For conventional heat exchangers to be operated at pressures about 400 psia, fin thickness required for mechanical strength may offset thermal performance. However, high temperature differences introduce thermal strains, independent of operating pressures, and partial height fins as described herein may be advantageous in such applications (e.g. having high differential temperature operation).

Still referring to FIGS. 1A-1C, in embodiments, e.g., either in the first fluid flow path 104, the third fluid flow path 108, or both, one or more stiffening elements 160 (e.g., connecting walls) may extend between and connect the first substrate 110 and the second substrate 120 and/or the third substrate 130 and the fourth substrate 150. For example, a plurality of stiffening elements 160 (e.g., two or more, three or more, fourth or more, etc.) may extend between the first sidewall 103a and the second sidewall 103b. The plurality of stiffening elements 160 may extend along the first and third fluid flow paths 104, 108 in the X direction of the depicted coordinate axes. In some embodiments, each of the plurality of stiffening elements 160 may extend across the entire heat exchanger 100 in the X direction of the depicted coordinate axes forming separated flow paths that are subsets of the overall flow path 104, 108. In some embodiments, the plurality of stiffening elements 160 may extend across only a portion of the heat exchange in the X direction of the depicted coordinate axes. As depicted in FIG. 1B, each of the stiffening elements 160 may be positioned so as to be aligned with a break between each row of the plurality of rows 146a-146f. The plurality of stiffening elements 160 may provide additionally rigidity to the structure.

As an example use case, the heat exchanger 100 may be used in an air-cooled oil cooler (ACOC) exchanger. In such embodiments, high pressure fluid streams of oil may be directed through the first fluid flow path 104 and/or the third fluid flow path 108. Heat from the hot oil may transfer to the heat exchanger 100. Cool air (or other cooling fluid) hitting the plurality of partial height fins 140 may absorb and remove heat from the heat exchanger 100. The plurality of partial height fins 140 may provide increased surface area (e.g., more exposed edges as compared to standard fins due to the terminal edges 144 and the staggered arrangement of rows) to allow the cool air to draw heat from the heat exchanger 100. The additional surface area may improve heat exchange efficiency. Moreover, as the partial height fins 140 are at least partially uncoupled from the second substrate 120 or the third substrate 130, the partial height fins 140 may bend or flex in the X direction of the depicted coordinate axes, which may reduce thermal stress, which may otherwise be experienced by more rigidly constrained fins. It is noted that in some embodiments, the heat exchanger 100 may be used as a heat source heat exchanger to add heat to a system as opposed to a heat sink heat exchanger to remove heat.

As noted herein, the heat exchanger 100 may be manufactured using additive manufacturing according to any of the techniques described herein. In embodiments, the heat exchanger 100 may be built along any direction such as along the X direction, the Y direction or the Z direction of the depicted coordinate axes. However, in some embodiments, the heat exchanger 100 may be formed through any conventional manufacturing process, which may include brazing the fins on each substrate and then brazing, welding, and/or diffusion bonding each fin/substrate layer into a final stacked heat exchanger configuration. Alternatively, the fins and/or substrates may be fixed in place (e.g., via a fixture) and the entire assembly brazed together in a single operation.

Embodiments below provide alternative embodiments of the heat exchanger 100 which are substantially similar to the embodiment described above unless otherwise noted or apparent from the figures. As will be described below, the following embodiments, may provide some additional benefits to improve manufacturability of monolithic heat exchangers using additive manufacturing.

Figure 2A:
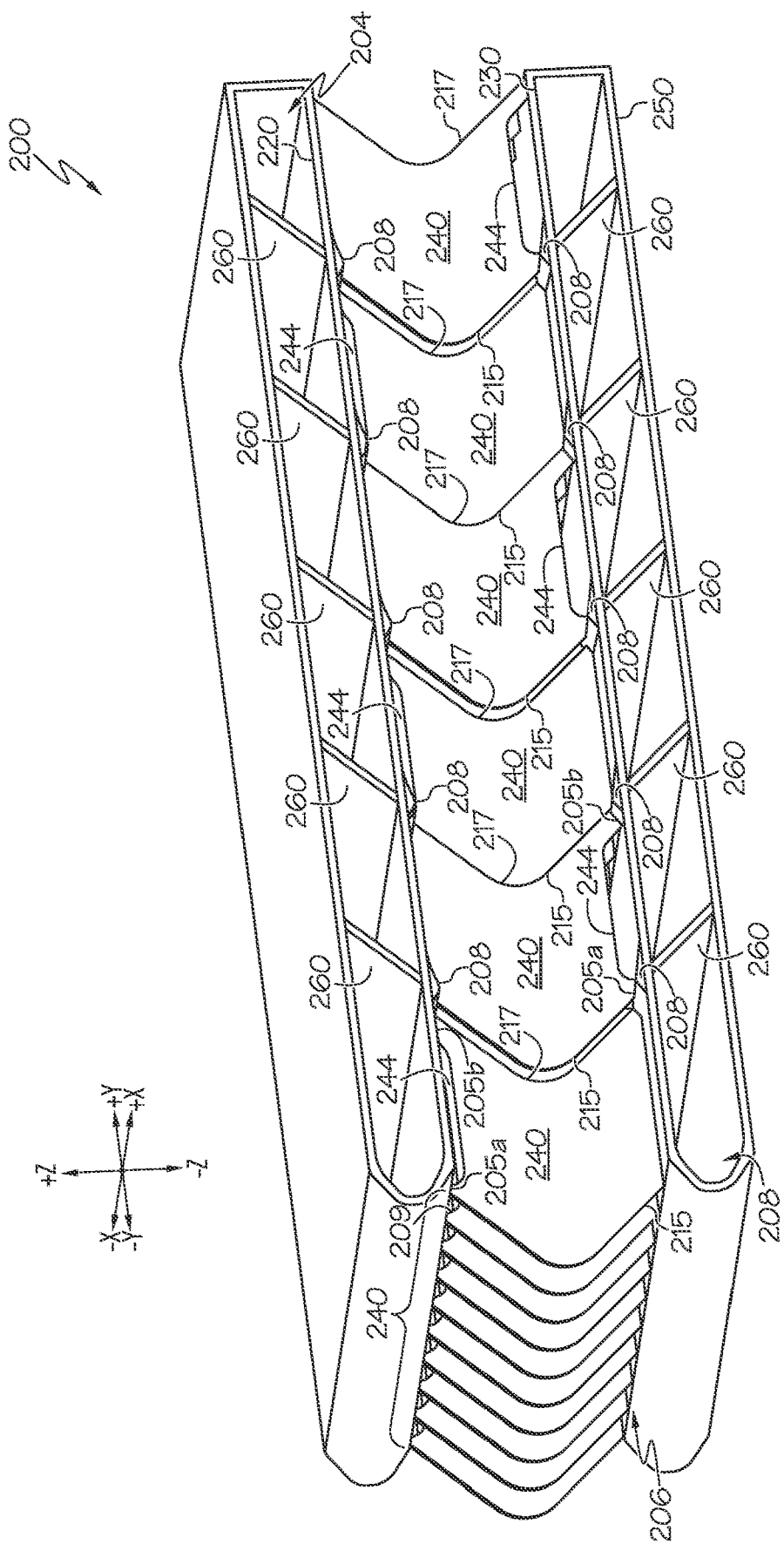
FIG. 2A schematically depicts another embodiment of a heat exchanger having a plurality of partial height fins, according to one or more embodiments shown and described herein.
Figure 2B:
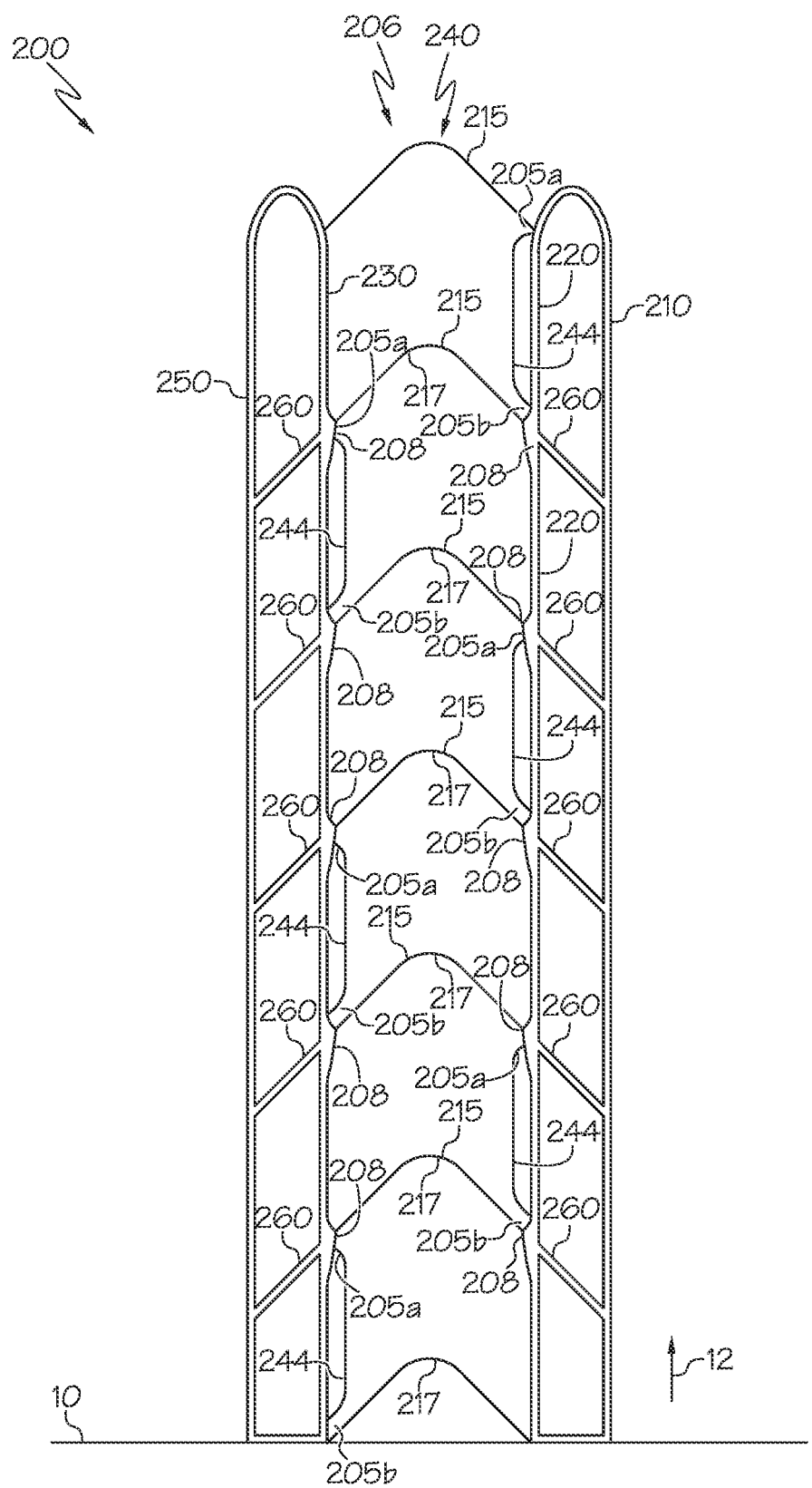
FIG. 2B depicts a side view of the heat exchanger of FIG. 2A, according to one or more embodiments shown and described herein.

FIGS. 2A and 2B depict an alternative embodiment of a heat exchanger 200. The heat exchanger 200 is similar to the heat exchanger 100 in that the heat exchanger 200 includes partial height fins and cross-flow paths among other things. Accordingly, the above-description of the heat exchanger 100 may be applicable to the embodiments of FIGS. 2A and 2B unless otherwise noted or apparent from the figures. In the depicted embodiment, each fin 240 of the plurality of fins comprises a convex longitudinal leading edge 215 and a concave longitudinal trailing edge 217. That is, the leading edge 215 of the fin 240 in the longitudinal direction (i.e., the Y direction of the depicted coordinate axes) is angled or curved convexly toward the −Y direction, and the trailing edge 217 of the fin 240 in the longitudinal direction is angled or curved concavely in the −Y direction of the depicted coordinate axes. Additionally, each stiffening element 260 located in either of a first fluid flow path 204 or a third fluid flow path 209 may be obliquely angled relative to the first substrate 210 and second substrate 220 (or the third substrate 230 and the fourth substrate 250) in the Y-Z plane of the depicted coordinate axes.

The angled surfaces of the convex longitudinal leading edge 215, the concave longitudinal trailing edge 217, and the stiffening elements 260 may provide improved arrangement to support additive manufacturing, such as through DMLM. In particular, and with reference to FIG. 2B, the heat exchanger 200 is arranged on a build platform 10 the build direction 12 is arranged vertically. It may be difficult to manufacture purely horizontal walls (e.g., walls arranged perpendicular to the build direction 12 when performing additive manufacturing, particularly horizontal walls suspended at a position spaced from the build platform 10. Accordingly, the angled and/or curved surfaces of the convex longitudinal leading edge 215, the concave longitudinal trailing edge 217, and the stiffening elements 260 can facilitate manufacturing by orienting the walls at an angle that is oblique to the horizontal axis making the walls more self-supporting. In embodiments, the angled surfaces of the convex longitudinal leading edge 215, the concave longitudinal trailing edge 217, and the stiffening elements 260 may be angled between about 10 degrees and 80 degrees relative to the horizontal (e.g., the ground or build platform), such between about 40 degrees and 60 degrees relative to the horizontal, such as about 45 degrees.

In some embodiments, it is contemplated that the leading edge 215 of the fin 240 may be flat or parallel with the horizontal while the trailing edge 217 of the fin 240 is concave. Such embodiments may still allow for ease of manufacturing with additive manufacturing, but may result in fins having a reduced heat transfer area. Accordingly, a convex longitudinal leading edge 215 may preserve heat transfer area, thereby providing improved heat transfer properties.

To maintain the profile of each fin 240 during manufacturing, it may be desirable to tie each fin 240 to both the second substrate 220 and the third substrate 230. For example, each of the partial height fins 240 may be connected to an opposite substrate from which the partial height fins 240 extends via one or more connecting feet 205a, 205b. For example, and as illustrated, each fin 240 may connect to an opposite substrate via a first connecting foot 205a and a second connecting foot 205b. The first connecting foot 205a may be arranged at the convex longitudinal leading edge 215 and the second connecting foot 205b may be arranged at the concave longitudinal trailing edge 217. Accordingly, the terminal edge 244 of each fin 240 may be spaced from the opposite substrate from which it extends between the first connecting foot 205a and the second connecting foot 205b so as to be at least partially spaced from the one of the second substrate 220 or the third substrate 130.

While the one or more connecting feet 205a, 205b may provide additional stability during manufacture, the one or more connecting feet 205a, 205b may be unnecessary during use of the heat exchanger 200. Accordingly, in embodiments, during use of the heat exchanger 200, the one or more connecting feet 205a, 205b may be designed to be breakable under the stresses experienced by the heat exchanger 200 during use. In such embodiments, a rib 208 of increased local material thickness may extend from the second substrate 220 and/or the third substrate 230 where the one or more connecting feet 205a, 205b connect thereto. The rib 208 may prevent damage to the heat exchanger 100 (e.g., openings between the first fluid flow path 204 or the third fluid flow path 209 to the second fluid flow path 206) when the one or more connecting feet 205a, 205b break from the second substrate 220 or the third substrate 230. The rib 208 may extend across the entire heat exchanger 100 in the X direction of the depicted coordinate axes, or only a portion thereof.

Figure 3A:
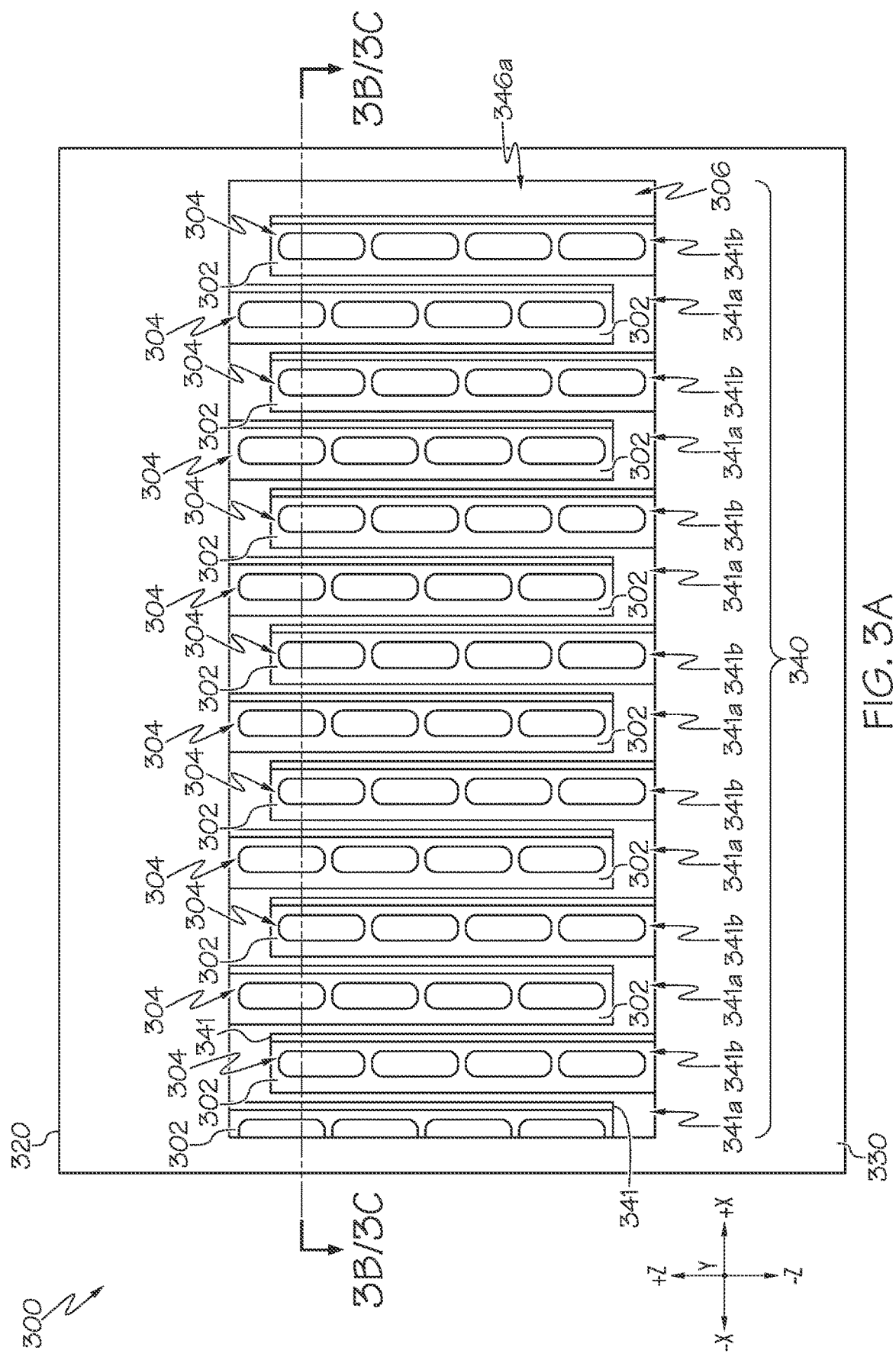
FIG. 3A schematically depicts a cross-section view of another embodiment of a heat exchanger, according to one or more embodiments shown and described herein.
Figure 3B:
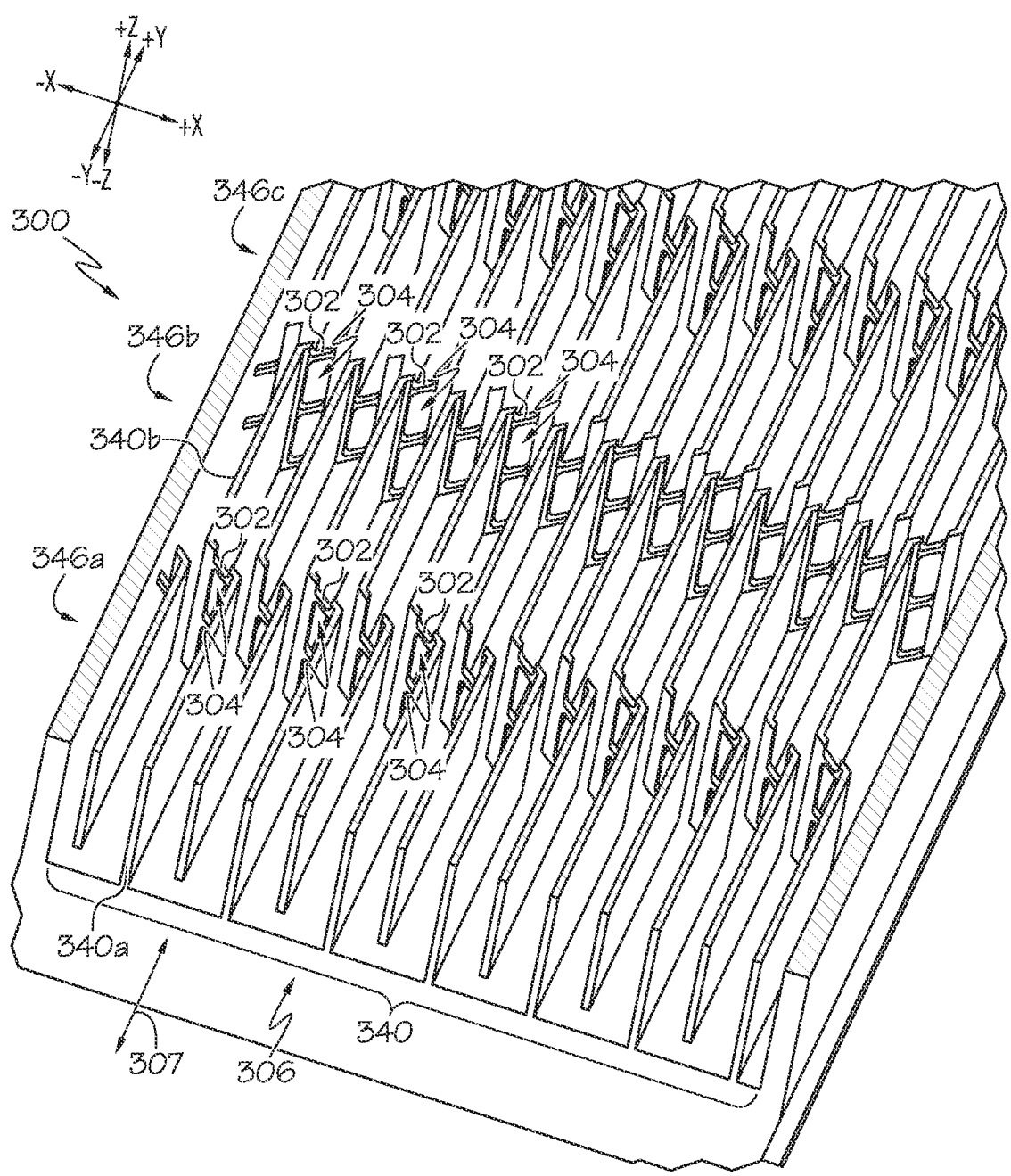
FIG. 3B depicts a front view of the heat exchanger of FIG. 3A, according to one or more embodiments shown and described herein.
Figure 3C:
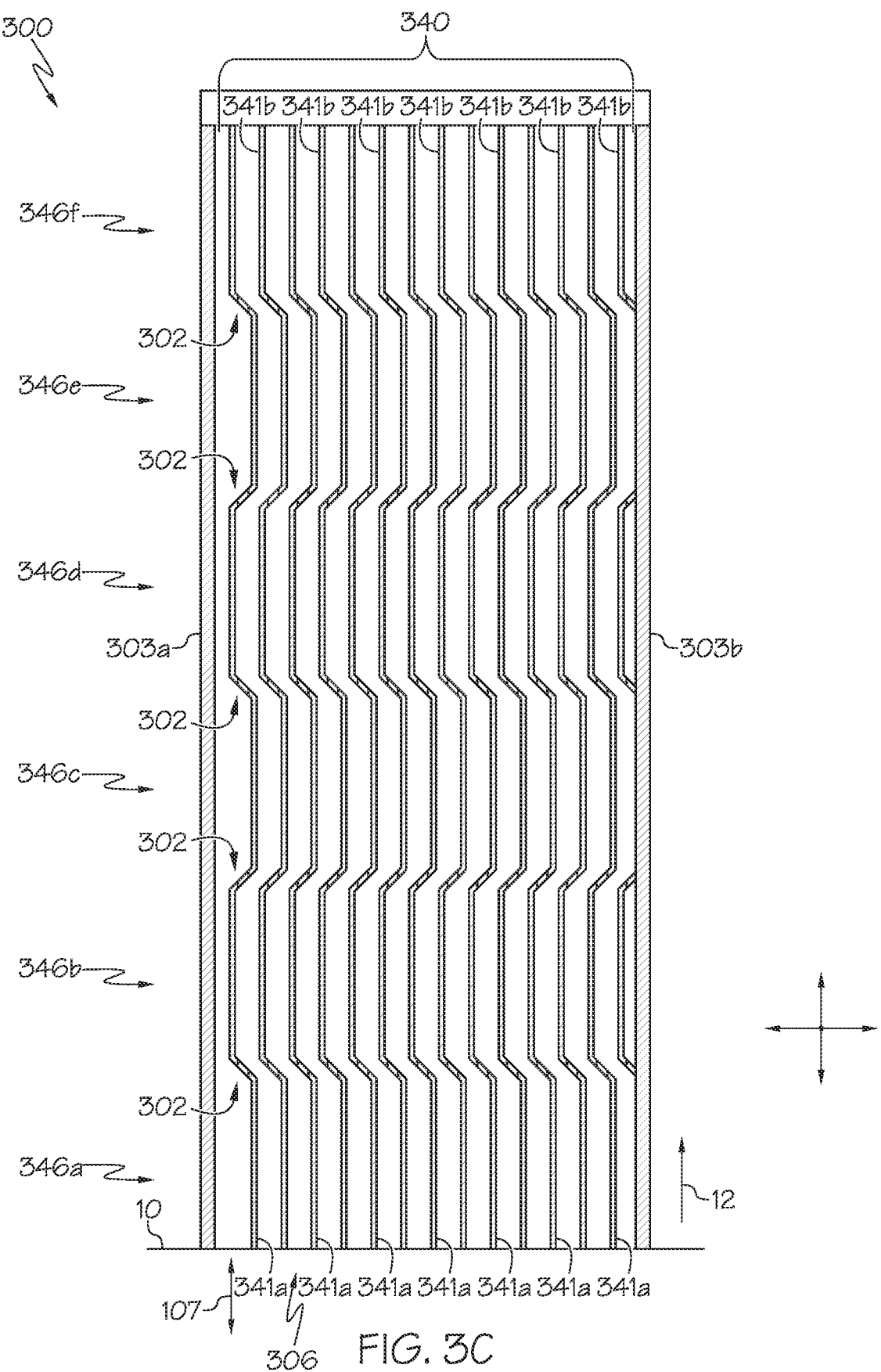
FIG. 3C depicts a top view of the cross-section of the heat exchanger of FIG. 3A, according to one or more embodiments shown and described herein.

Referring now to FIGS. 3A-3C yet another embodiment of a heat exchanger 300 is schematically depicted. The heat exchanger 300 is similar to the heat exchanger 100 embodiments described above. For example, the heat exchanger 300 includes partial height fins 340 positioned within a fluid flow path 306. Accordingly the above-description of the heat exchanger 100/200 is applicable to the embodiment of FIGS. 3A-3C unless otherwise noted or apparent from the figures and will not be repeated. While not shown, the heat exchanger 300 may include a plurality of fluid flow paths, beyond fluid flow path 306, such as illustrated with respect to heat exchangers 100/200, described above. For example, the heat exchanger 300 may include a first fluid flow path, a second fluid flow path, a third fluid flow path etc., to provide any cross-flow or counter-flow heat exchanger as desired.

In the present embodiment, positioned within the fluid flow path 306 in conjunction with the plurality of partial height fins 340 may be a plurality of connector fins 302. The plurality of connector fins 302 may each connect a first fin 340*a* of one row to a second fin 340*b* in a second row adjacent to the first row.

In this embodiment, as with embodiments above, the plurality of partial height fins 340 are arranged in a plurality of rows 346*a*-346*f*. However, in this embodiment, each row includes fins 340 of both the first type 341*a* (e.g., extending from substrate 320, wherein at least a portion of the terminal edge 344 of each fin 340 is spaced from the opposite substrate 330), and the second type 341*b* (e.g., extending from substrate 330, wherein at least a portion of the terminal edge 344 of each fin 340 is spaced from the opposite substrate 320). For example, the first row 346*a* may include fins 340 of the first type 341*a* alternating with fins 340 of the second type 341*b* such that every other fin 340 is a fin 340 of the first type 341*a* and every remaining fin 340 is a second type 341*b*. The second row 346*b* may also include fins 340 of the first type 341*a* alternating with fins 340 of the second type 341*b* such that every other fin 340 is a first type 341*a* and every remaining fin is a second type 341*b*, but in opposite order to the first row 346*a*. The third row 346*c* may be arranged substantially similar to the first row 346*a*, the fourth row 346*d* may be arranged substantially similarly to the second row 346*b*, and so on depending on the number of desired rows.

In embodiments, the plurality of connector fins 302 may connect the fins of each rows 346*a*-346*f*. For example, a connector fin 302 may connect a first fin 340*a* of the first row 346*a* to a second fin 340*b* in the second row 346*b* adjacent to the first row 346*a*. In embodiments, the plurality of connector fins 302 may connect two fins 340 of the same type (e.g., first type 341*a* or second type 341*b*), such as illustrated in FIG. 3C. In embodiments, connector fins 302 may connect the first fin of each row to one another, the second fins of each row to one another, the third fins of each row to one another, etc. In some embodiments, and as illustrated in FIG. 3C, a connector fin 302 may connect a fin 340 to a sidewall (e.g., the second sidewall 303*b* opposite the first sidewall 303*a* in the present embodiment) where there is not a corresponding fin 340 in the adjacent row.

It is noted that the connector fins 302, similar to the plurality of partial height fins 340 described above, may extend from one of substrate 320 and substrate 330 and be at least partially (or wholly) spaced from the other of substrate 320 and substrate 330 depending on which substrate 320, 330 that the connector fin 302 extends from. For example, where a connector fin 302 is connecting fins 340 of the first type 341*a*, the connector fin 302 may extend from substrate 320 and may be spaced from substrate 330. Similarly, wherein a connector fin 302 is connecting fins 340 of the second type 341*b*, the connector fin 302 may extend from substrate 330 and may be spaced from substrate 320. Each of the connector fins 302 may be arranged at an oblique angle relative to the direction of flow 307 through the fluid flow path 306 in the X-Z plane of the depicted coordinate axes in FIG. 3C.

Still referring to FIGS. 3A-3C, in embodiments, the plurality of connector fins 302 may each define one or more fluid openings 304 extending therethrough and arranged to allow fluid to flow through the plurality of connector fins 302 along the direction of flow 307 of the fluid flow path 306. In some embodiments, each connector fin 302 may define a plurality of fluid openings 304 extending therethrough (e.g., two or more, three or more, four or more, etc.). The size and/or shape of the openings may be designed to provide certain desired flow properties through the fluid flow path 306. For example, though the one or more fluid openings 304 are depicted as oval-shaped, the one or more fluid openings 304 may be any polygonal or non-polygonal, regular or irregular shape (e.g., circular, rectangular, triangular, etc.). In embodiments, it is contemplated the one or more fluid openings 304 may provide balanced flow through the second fluid flow path 106. For example, an increased number of fluid openings 304 at a smaller diameter may balance flow split between the various channels defined by the plurality of partial height fins 340 and connector fins 302.

Referring to FIG. 3C the heat exchanger 300 is arranged on a build platform 10 and the build direction 12 is arranged vertically (along the Z direction of the depicted coordinate axes). As noted above, it may be difficult to manufacture horizontal surfaces (e.g., surfaces arranged perpendicular to the build direction 12 when performing additive manufacturing, particularly surfaces suspended at a position spaced from the build platform 10. Accordingly, by obliquely angling each connector fin 302, the heat exchanger 300 may be more easily manufactured by additive manufacturing the connector fins 302 may provide support to support a leading or trailing edge of each fin 340, such as described above. In embodiments, the angled orientation of each connector fin 340 relative to the direction of flow 307 through the fluid flow path 306 may be between about 10 degrees and 80 degrees relative to the horizontal, such between about 40 degrees and 60 degrees relative to the horizontal, such as about 45 degrees.

Figure 4A:
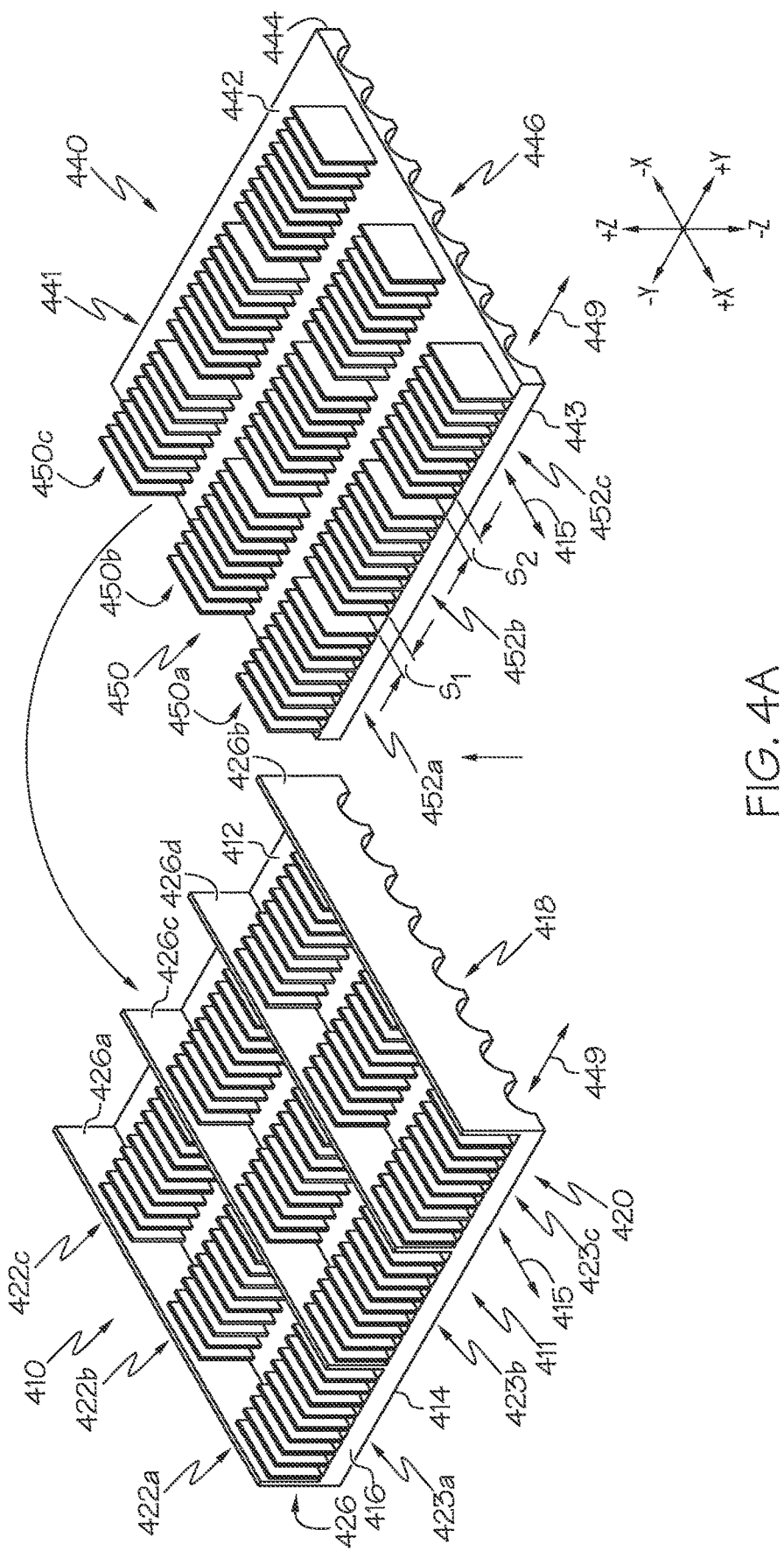
FIG. 4A depicts supporting and non-supporting substrate layers for use as layers of a heat exchanger having a non-monolithic structure, according or one or more embodiments shown and described herein.

As noted above, in some embodiments, instead of forming the heater exchanger monolithically, it may be desirable to form separate layers, which may provide for simplified mechanical analysis and more determinist load paths. In particular, FIG. 4A illustrates an alternative embodiment including separate substrate layers for production of a heat exchanger 100, illustrated in FIGS. 4B and 4C. In this embodiment, the heat exchanger 400 may be formed from one or more supporting substrate layers 410 layered with one or more non-supporting substrates layers 440. Each of the substrate layers 410, 440 may be additively manufactured and diffusion bonded or otherwise coupled to one another. However, other manufacturing processes are also contemplated and possible.

The supporting substrate layer 410 may include a base plate 411 having a first outer surface 412 and a second outer surface 414 opposite the first outer surface 412. The first and second outer surfaces 412, 414 may be parallel and coextensive with one another. A sidewall 416 may extend between the first outer surface 412 and the second outer surface 414. The sidewall 416 may be perpendicular to both the first outer surface 412 and the second outer surface 414 and extend along an outer perimeter of the first outer surface 412 and the second outer surface 414. For example, where the overall shape of the supporting substrate layer 410 is rectangular such that there may be four sidewalls.

A first plurality of fins 420 may be formed (e.g., through additive manufacturing) and extend from the first outer surface 412 of the base plate 411. Each fin may extend generally parallel to the vertical direction (i.e., the Z-axis of the depicted coordinate axes). Each fin of the first plurality of fins 420 may have a thickness of about 5 mm to about 10 mm along the Y direction of the depicted coordinate axes and may have a length (along the X direction) and a height (along the Z direction) that is larger than the width-wise dimension of the fin. The lengthwise dimension of the plurality of fins 420 may be arranged parallel to the flow direction 415, as illustrated.

The first plurality of fins 420 may be arranged in two or more discrete rows of fins (e.g., row 422a, 422b, and/or 422c, though a greater number of rows are contemplated and possible) that extend in a line transverse to the flow direction 415 of fluid through the first plurality of fins 420 (i.e., along the Y direction of the depicted coordinate axes). Each row 422a, 422b, and/or 422c may be arranged parallel to an adjacent row and extends across the substrate along the Y-axis of the depicted coordinate axes.

Two or more attachment walls 426 may be formed and extend from the first outer surface 412 of the base plate 411 to a distance (i.e., height) greater than the first plurality of fins 420. The two or more attachment walls 426 may thereby provide attachment points at which the non-supporting substrate layer 440 may be bonded (e.g., through diffusion bonding) or otherwise coupled to the non-supporting substrate layer 440 without contacting the first plurality of fins 420. The two or more attachment walls 426 include at least a first attachment wall 426a and a second attachment wall 426b. The first and second attachments walls 426a, 426b may be arranged at either end of the first plurality of fins 420 in the Y direction of the depicted coordinate axes such that the first plurality of fins 420 are arranged completely between the first attachment wall 426a and the second attachment wall 426b. In some embodiments, and as illustrated, additional attachment walls may be arranged between the first attachment wall 426a and the second attachment wall 426b, such as a third attachment wall 426c and/or a fourth attachment wall 426d. The third attachment wall 426c and/or the fourth attachment wall 426d may divide the first plurality of fins 420 into two or more discrete groups (e.g., group 423a, group 423b, and/or group 423c). Each group 423a, 423b, 423c may have an equal number of fins or an unequal number of fins.

The two or more attachment walls 426 may have a thickness in the Y direction of the depicted coordinate axes that is greater that the thickness of the fins of the first plurality of fins 420. In yet further embodiments, the thickness of the two or more attachment walls 426 may be less than or equal to the thickness of the first plurality of fins 420. It is noted that while the two or more attachment walls 426 are illustrated as having a uniform thickness along their lengths in the X direction of the depicted coordinate axes, in some embodiments, the two or more attachment walls 426 may have more truss-like frames such that openings are formed through the thicknesses of the two or more attachment walls. Such openings may provide for desirable weight reduction. In some embodiments, only the internally arranged attachment wall(s) (e.g., third attachment wall 426c and/or fourth attachment wall 426d) may include openings formed therethrough, while the first and second attachment walls 426a, 426b are solid without any openings formed therein, to prevent fluid from leaking from the heat exchanger.

Figure 4B:
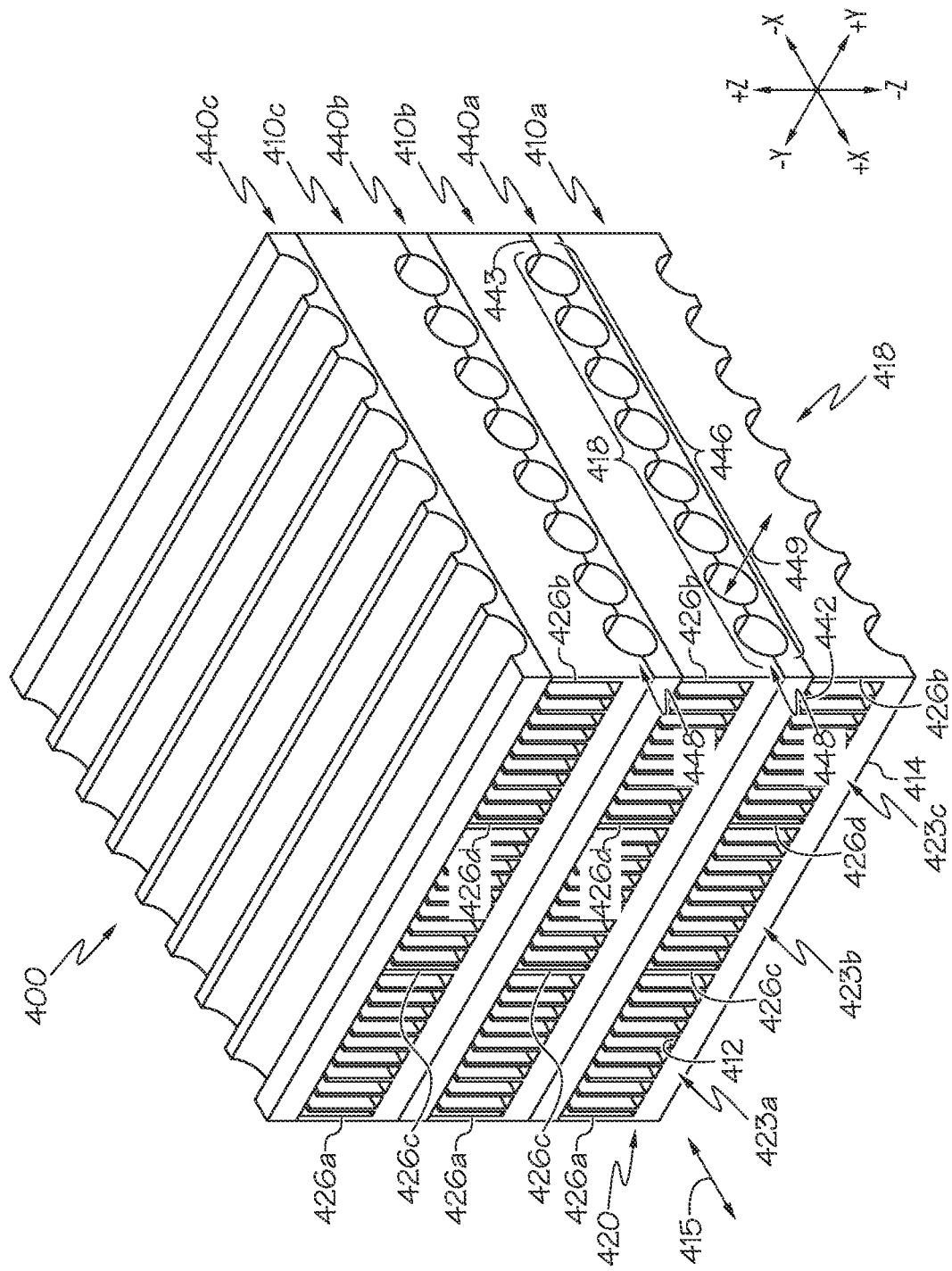
FIG. 4B depicts a perspective view of a heat exchanger assembled from the supporting and non-supporting substrate layers of FIG. 4A, according to one or more embodiments shown and described herein.

Formed in the second outer surface 414 of the base plate 411 may be one or more partial fluid flow channels 418. The one or more partial fluid flow channels 418 may extend along the entire length of the second outer surface 414 in the Y direction of the depicted coordinate axes. The one or more partial fluid flow channels 418 may have any cross-sectional shape, for example, a portion of a circle, oval, rectangle, or any regular or irregular polygonal or non-polygonal shape. In the illustrated embodiment, the one or more partial fluid flow channels 418 may include a plurality of partial fluid flow channels 418 formed within the second outer surface 414, for example, two or more partial fluid flow channels, four or more partial fluid flow channels, six or more partial fluid flow channels, etc. Each of the one or more partial fluid flow channels 418 may run parallel to each other across the base plate 411. Each of the one or more partial fluid flow channels 418 may have the same shape or different shapes. As will be described in greater detail, the one or more partial fluid flow channels 418 of the supporting substrate layer 410 may be combined with one or more partial fluid flow channels 446 formed in a non-supporting substrate layer 440 to form one or more combined fluid flow channels 448, as illustrated in FIG. 4B.

The non-supporting substrate layer 440 may include a base plate 441 having a first outer surface 442 and a second outer surface 443 opposite the first outer surface 442. The first and second outer surfaces 442, 443 may be parallel and coextensive with one another. A sidewall 444 may extend between the first outer surface 442 and the second outer surface 443. The sidewall 444 may be perpendicular to both the first outer surface 442 and the second outer surface 443 and extend along an outer perimeter of the first outer surface 442 and the second outer surface 443. For example, where the overall shape of the non-supporting substrate layer 440 is rectangular, there may be four sidewalls.

A second plurality of fins 450 may be formed (e.g., through additive manufacturing) and extend from the first outer surface 442 of the base plate 441. Each fin may extend generally parallel to the vertical direction (i.e., the Z-axis of the depicted coordinate axes). Each of the fins of the second plurality of fins 450 may have a thickness of about 2 mm to about 10 mm along the Y direction of the depicted coordinate axes and may have a length (along the X direction) and a height (along the Z direction) that are larger than the width-wise dimension of the fin. The lengthwise dimension of the second plurality of fins 450 may be arranged parallel to the flow direction 415.

The second plurality of fins 450 may be arranged in two or more discrete rows of fins (e.g., row 450a, 450b, and/or 450c, through a greater number of rows are contemplated and possible) that extend in a line transverse to the flow direction 415 of fluid through the second plurality of fins 450 (i.e., along the Y direction of the depicted coordinate axes). Each row 450a, 450b, and/or 450c may be arranged parallel to an adjacent row and extends across the substrate along the Y-axis of the depicted coordinate axes.

Figure 4C:
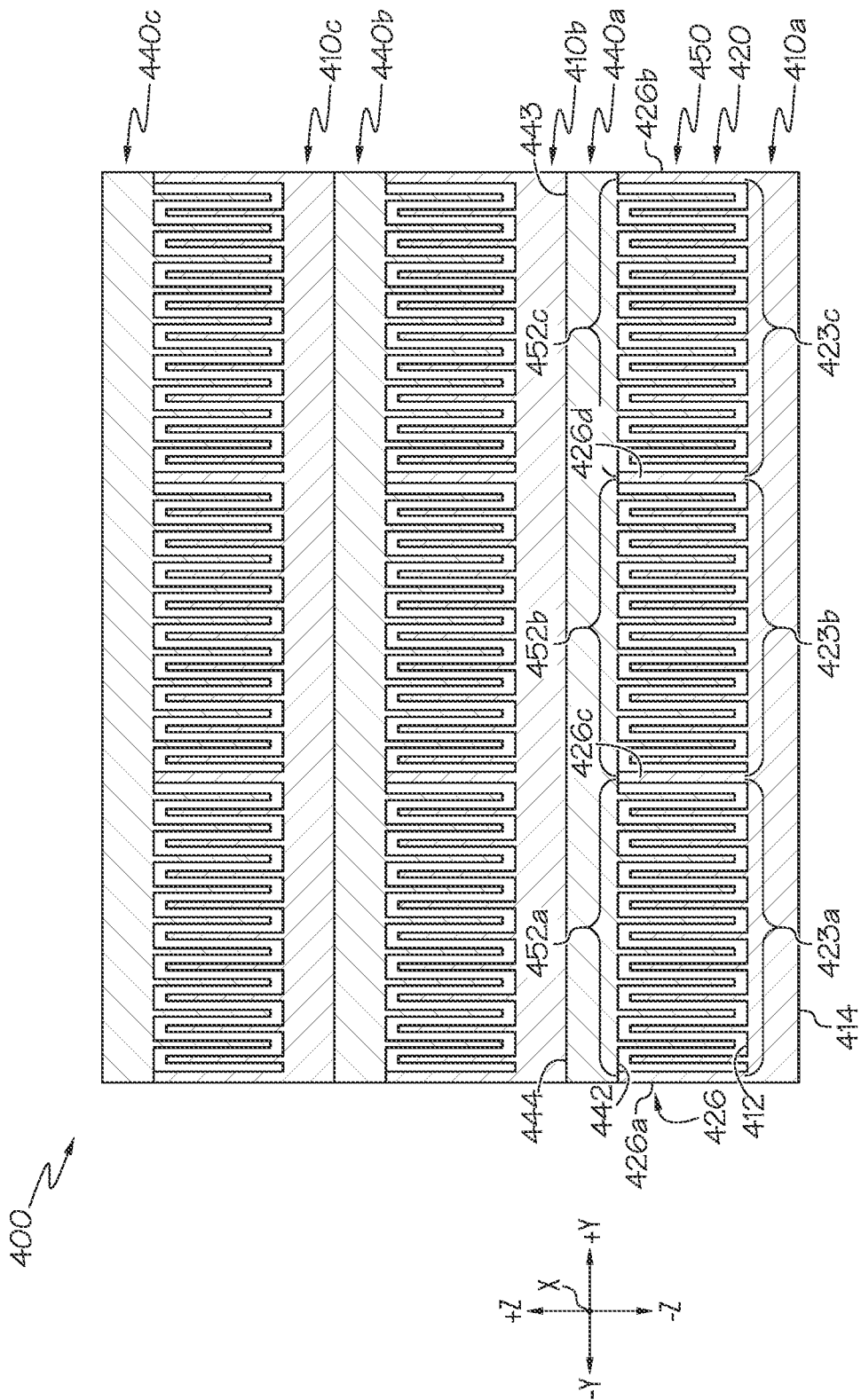
FIG. 4C depicts a side view of the heat exchanger of FIG. 4B, according to one or more embodiments shown and described herein.

Each row may be separated into two or more groups (e.g., group 452a, group 452b, and/or group 452c). The two or more groups may be apparent due to an increased spacing (e.g., $s_1$, $s_2$) between adjacent groups as compared to spacing between adjacent fins within a single group. The increased spacing may allow for insertion of the attachment walls 426c and/or 426d to extend between and separate the second plurality of fins into the two or more groups, as illustrated in FIG. 4C.

Formed in the second outer surface 443 of the base plate 441 may be one or more partial fluid flow channels 446. The one or more partial fluid flow channels 446 may extend along the entire length of the second outer surface 443 in the Y direction of the depicted coordinate axes. The one or more partial fluid flow channels 446 may have any cross-sectional shape, for example, a portion of a circle, oval, rectangle, or any regular or irregular polygonal or non-polygonal shape. In the illustrated embodiment, the one or more partial fluid flow channels 446 may include a plurality of partial fluid flow channels 446 formed within the second outer surface 443, for example, two or more partial fluid flow channels, four or more partial fluid flow channels, six or more partial fluid flow channels, etc. Each of the one or more partial fluid flow channels 446 may run parallel to each other across the substrate. Each of the one or more partial fluid flow channels 446 may have the same shape or different shapes. As will be described in greater detail, the one or more partial fluid flow channels 446 of the non-supporting substrate layer 440 may be combined with one or more partial fluid flow channels 418 formed in a supporting substrate layer 410 to form one or more combined fluid flow channels 448, as illustrated in FIG. 4B.

It is further noted, that though not shown, the supporting and non-supporting substrate layers 410, 440 may include one or more alignment mechanisms to aid in aligning the one or more partial fluid flow channels 418, 446. For example, a protrusion may be formed on one of the second outer surface 414 of the supporting substrate layer 410 or the second outer surface 443 of the non-supporting substrate layer 440 and a matching recess may formed on the other of the second outer surface 414, 443 of the supporting substrate layer 410 or the non-supporting substrate layer 440. During assembly, the protrusion may be mated with the recess to aid in alignment and assembly.

In some embodiments, when forming the supporting and non-supporting substrate layers 410, 440 with additive manufacturing (e.g., DMLM) the direction of build may be along the Z direction of the depicted coordinate axes. This direction may optimize fin formation so as to produce fins having thinner profiles (e.g., less than about 20 mm thick, less than about 15 mm thick, less than 12 mm thick, between about 5 mm to about 20 mm thick, such as about 15 mm to about 20 mm, or the like). However, it is noted that other build directions are contemplated and possible (e.g., along the Y direction and/or along the X direction). Additionally, it is noted that the supporting substrate layer 410 and the non-supporting substrate layer 440 may be formed through other manufacturing processes (e.g., mechanically coupling fins to a surface of a substrate and etching, milling, and/or carving partial fluid flow channels on an opposite surface) such as described herein.

During the assembly, the non-supporting substrate layer 440 may be rotated about the X axis of the depicted coordinate axes and placed on the two or more attachment walls 426 of the supporting substrate layer 410. As illustrated in FIGS. 4B and 4C, a heat exchanger 400 as depicted is formed from alternating layers of supporting and non-supporting substrate layers 410, 440. It is noted that a heat exchanger 400 includes at least a first supporting substrate layer 410a and a first non-supporting substrate layer 440a. When assembled, the first outer surface 442 of the non-supporting substrate layer 440 sits on the two or more attachment walls 426 (e.g., 426a-426d) of the supporting substrate layer 410. Each adjacent fin of the first plurality of fins 420 are thereby separated from one another by a fin of the second plurality of fins 450. In this way, one or more fluid flow paths are formed by the first plurality of fins 420, the second plurality of fins 450, and the two or more attachment walls 426. Additionally, as shown, the first plurality of fins 420 and the second plurality of fins 450 are partial height fins in that that are at least partially spaced from the opposite substrate layer from which the extend, thereby providing greater thermal compliance, improved life, and reduced stress.

As illustrated in FIGS. 4B and 4C, a subsequent supporting substrate layer 410b may be layered on top of the second outer surface 443 of the non-supporting substrate layer 440a, in the Z direction of the depicted coordinate axes, such that the plurality of partial fluid flow channels 418 of the subsequent supporting substrate layer 410b and the plurality of partial fluid flow channels 446 of the non-supporting substrate layer 440 are combined to form a plurality of combined fluid flow channels 448 that define a plurality of fluid flow paths. The flow direction 449 of the combined fluid flow channels 448 may be parallel to or transverse to the flow direction 415 of the one or more fluid flow paths provided by the first plurality of fins 420, the second plurality of fins 450, and the two or more attachment walls 426 (as illustrated in FIG. 4B). Additional non-supporting substrate layers (e.g., 440b, 440c) and supporting substrate layers (410c) may be added as desired to form the desired heat exchanger 400. The various layers may be diffusion bonded or otherwise coupled to one another. Prior to bonding the various layers together, each substrate layer may be inspected for defects, geometrical tolerances, and/or hydraulic and/or thermal performance characteristics.

It is noted that in the above embodiments, thought the fin are illustrated as having a particular configuration, it is contemplated different rows of the heat exchanger may have different configurations. For example, in some embodiments, each layer may have partial height fins as described herein. In other embodiments, only some layers may have partial height fins. Moreover, in some embodiments, fins within the same layer may include partial height fins and full height fins. For example, it may be advantageous to have partial height fins within select regions of a heat exchanger, while other regions of the heat exchanger include full height fins.

Further aspects of the present disclosure are provided by the subject matter of the following numbered clauses.

1. A heat exchanger comprising: a monolithic body comprising: a first substrate; a second substrate arranged parallel to and spaced from the first substrate, thereby defining a first fluid flow path; a third substrate arranged parallel to and spaced from the second substrate opposite the first substrate, thereby defining a second fluid flow path; and a plurality of partial height fins extending from one of the second substrate and the third substrate toward the other of the second substrate or the third substrate, wherein a terminal edge of each partial height fin is at least partially spaced from the other of the second substrate or the third substrate.

2. The heat exchanger of clause 1, wherein the plurality of partial height fins are sized and shaped to minimize thermal stresses between each fin and an opposite substrate from which it extends.

3. The heat exchanger of any preceding clause, further comprising a plurality of stiffening elements extending between the first substrate and the second substrate.

4. The heat exchanger of any preceding clause, further comprising a fourth substrate arranged parallel to and spaced from the third substrate opposite the second substrate, thereby defining a third fluid flow path.

5. The heat exchanger of any preceding clause, wherein the plurality of partial height fins comprise: a first type of partial height fin extending from the second substrate into the second fluid flow path; and a second type of partial height fin extending from the third substrate into the second fluid flow path.

6. The heat exchanger of any preceding clause, wherein the plurality of partial height fins comprise a plurality of rows of partial height fins arranged side-by-side in a longitudinal direction wherein each row alternates between the first type of partial height fin and the second type of partial height fin.

7. The heat exchanger of any preceding clause, wherein the plurality of partial height fins of at least one row is laterally offset in a direction perpendicular to the second fluid flow path from the plurality of partial height fins of an adjacent row.

8. The heat exchanger of any preceding clause, wherein the plurality of partial height fins is connected to an opposite substrate from which the plurality of partial height fins extends via one or more connecting feet.

9. The heat exchanger of any preceding clause, wherein each fin comprises a convex longitudinal leading edge and a concave longitudinal trailing edge.

10. A heat exchanger comprising: a monolithic body comprising: a plurality of substantially parallel substrates layered one over the over; and a plurality of partial height fins extending from one of the plurality of substrates toward an adjacent one of the plurality of substrates, wherein a terminal edge of each fin is only partially spaced from the adjacent one of the plurality of substrates to define a connecting foot that is connected to the adjacent one of the plurality of substrates.

11. The heat exchanger of any preceding clause, further comprising a plurality of stiffening elements extending between a first substrate and a second substrate of the plurality of substrates, wherein each stiffening element is obliquely angled relative to the first substrate and the second substrate.

12. The heat exchanger of any preceding clause, wherein each fin comprises a convex longitudinal leading edge and a concave longitudinal trailing edge.

13. The heat exchanger of any preceding clause, wherein the plurality of partial height fins comprise: a first type of partial height fin, wherein the first type extends from a first substrate of the plurality of substrates into a fluid flow path; and a second type of partial height fin, wherein the second type extends from a second substrate of the plurality of substrates into the fluid flow path.

14. The heat exchanger of any preceding clause, wherein the plurality of partial height fins comprise a plurality of rows of partial height fins arranged side-by-side in a longitudinal direction wherein each row alternates between the first type of partial height fins and the second type of partial height fins.

15. The heat exchanger of any preceding clause, wherein the plurality of partial height fins of at least one row is laterally offset in a direction perpendicular to the fluid flow path from the plurality of partial height fins of an adjacent row.

16. The heat exchanger of any preceding clause, wherein the plurality of partial height fins are connected to an opposite substrate from which the plurality of partial height fins extends via a first connecting foot and a second connecting foot.

17. A heat exchanger comprising: a monolithic body comprising: a first substrate; a second substrate arranged parallel to and spaced from the first substrate, thereby defining a first fluid flow path; a third substrate arranged parallel to and spaced from the second substrate opposite the first substrate, thereby defining a second fluid flow path; and a plurality of partial height fins extending between the second substrate and the third substrate, wherein a terminal edge of each fin is at least partially spaced from one of the second substrate or the third substrate, the plurality of partial height fins comprising: a first type of partial height fin extending from the second substrate into the second fluid flow path; a second type of partial height fin extending from the third substrate into the second fluid flow path, wherein the plurality of partial height fins comprise a plurality of rows of partial height fins arranged in side-by-side, wherein each row comprises fins of the first type and the second type; and a plurality of connector fins each connecting a first fin in a first row to a second fin in a second row, wherein each connector fin is arranged at an oblique angle to a flow direction through the second fluid flow path.

18. The heat exchanger of any preceding clause, further comprising a plurality of stiffening elements extending between the first substrate and the second substrate, wherein each stiffening element is obliquely angled relative to the first substrate and the second substrate.

19. The heat exchanger of any preceding clause, further comprising a fourth substrate arranged parallel to and spaced from the third substrate opposite the second substrate, thereby defining a third fluid flow path.

20. The heat exchanger of any preceding clause, wherein each connector fin defines one or more fluid openings extending therethrough.

21. The heat exchanger of any preceding clause, wherein every other fin in each row of the plurality of rows of partial height fins is a fin of the first type, and a connector fin of the plurality of connector fins connects two fins of the first type.

It should now be understood that embodiments as described herein are directed to heat exchangers that include partial height fins. For example, in at least some embodiments, heat exchangers according to the present disclosure include a monolithic body comprising a first substrate, a second substrate, a third substrate, and a plurality of partial height fins. The second substrate is arranged parallel to and spaced from the first substrate, thereby defining a first fluid flow path. The third substrate is arranged parallel to and spaced from the second substrate opposite the first substrate, thereby defining a second fluid flow path. The plurality of partial height fins extend between the second substrate and the third substrate, wherein a terminal edge of each partial height fin is at least partially spaced from the other of the second substrate or the third substrate. Use of partial height fins (as opposed to full-height fins) may provide improved thermal performance, reduced thermal strain, and longer heat exchanger life.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A heat exchanger comprising:
 a monolithic body comprising:
  a first substrate;
  a second substrate arranged parallel to and spaced from the first substrate, thereby defining a first fluid flow path;
  a third substrate arranged parallel to and spaced from the second substrate opposite the first substrate, thereby defining a second fluid flow path;
  a plurality of partial height fins extending from one of the second substrate and the third substrate toward the other of the second substrate or the third substrate, wherein a terminal edge of each partial height fin is at least partially spaced from the other of the second substrate or the third substrate, wherein the plurality of partial height fins is connected to an opposite substrate from which the plurality of partial height fins extends via a plurality of breakable connecting feet, wherein the plurality of breakable connecting feet break away from the opposite substrate in response to operation of the heat exchanger, wherein the plurality of partial height fins are in continuous contact with the substrate from which the plurality of partial height fins extend along a first end and in intermittent contact via the plurality of breakable connecting feet at the opposite substrate; and
  a rib extending along the opposite substrate and connecting one or more breakable connecting feet to the opposite substrate.

2. The heat exchanger of claim 1, further comprising a plurality of stiffening elements extending between the first substrate and the second substrate.

3. The heat exchanger of claim 1, further comprising a fourth substrate arranged parallel to and spaced from the third substrate opposite the second substrate, thereby defining a third fluid flow path.

4. The heat exchanger of claim 1, wherein the plurality of partial height fins comprise:
 a first type of partial height fin extending from the second substrate into the second fluid flow path; and
 a second type of partial height fin extending from the third substrate into the second fluid flow path.

5. The heat exchanger of claim 4, wherein the plurality of partial height fins comprise a plurality of rows of partial height fins arranged side-by-side in a longitudinal direction wherein each row comprises either the first type of partial height fin or the second type of partial height fin and wherein each adjacent row comprises a different type fin from one another.

6. The heat exchanger of claim 5, wherein the plurality of partial height fins of at least one row is laterally offset in a direction perpendicular to the second fluid flow path from the plurality of partial height fins of an adjacent row.

7. The heat exchanger of claim 1, wherein each fin comprises a convex longitudinal leading edge and a concave longitudinal trailing edge.

8. A heat exchanger comprising:
 a monolithic body comprising:
  a plurality of substantially parallel substrates layered one over the over; and
  a plurality of partial height fins extending from one of the plurality of substrates toward an adjacent one of the plurality of substrates, wherein a terminal edge of each fin is spaced from the adjacent one of the plurality of substrates to define a plurality of breakable connecting feet that are connected to the adjacent one of the plurality of substrates, wherein the plurality of breakable connecting feet break away from the adjacent substrate in response to operation of the heat exchanger, wherein the plurality of partial height fins are in continuous contact with a substrate from which the plurality of partial height fins extend along a first end and in intermittent contact via the plurality of breakable connecting feet at an opposite substrate; and
  a rib extending along the opposite substrate and connecting one or more breakable connecting feet to the opposite substrate.

9. The heat exchanger of claim 8, further comprising a plurality of stiffening elements extending between a first substrate and a second substrate of the plurality of substrates, wherein each stiffening element is obliquely angled relative to the first substrate and the second substrate.

10. The heat exchanger of claim 8, wherein each fin comprises a convex longitudinal leading edge and a concave longitudinal trailing edge.

11. The heat exchanger of claim 8, wherein the plurality of partial height fins comprise:
 a first type of partial height fin, wherein the first type extends from a first substrate of the plurality of substrates into a fluid flow path; and
 a second type of partial height fin, wherein the second type extends from a second substrate of the plurality of substrates into the fluid flow path.

12. The heat exchanger of claim 11, wherein the plurality of partial height fins comprise a plurality of rows of partial height fins arranged side-by-side in a longitudinal direction wherein each row comprises either the first type of partial height fins or the second type of partial height fins and wherein each adjacent row comprises a different type fin from one another.

13. The heat exchanger of claim 12, wherein the plurality of partial height fins of at least one row is laterally offset in a direction perpendicular to the fluid flow path from the plurality of partial height fins of an adjacent row.

* * * * *